United States Patent
Rotenberg

(10) Patent No.: US 10,807,467 B2
(45) Date of Patent: Oct. 20, 2020

(54) EPICYCLIC GEARBOX

(71) Applicant: Borealis Technical Limited, North Plains, OR (US)

(72) Inventor: Yonatan Rotenberg, Miami, FL (US)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 16/362,060

(22) Filed: Mar. 22, 2019

(65) Prior Publication Data
US 2019/0291575 A1 Sep. 26, 2019

Related U.S. Application Data

(60) Provisional application No. 62/647,172, filed on Mar. 23, 2018.

(51) Int. Cl.
*F16H 1/28* (2006.01)
*B60K 17/04* (2006.01)

(52) U.S. Cl.
CPC ............ *B60K 17/046* (2013.01); *F16H 1/28* (2013.01)

(58) Field of Classification Search
CPC ............... B60K 17/046; B60K 7/0007; B60K 2007/0092; B60K 2007/0038; F16H 1/28; F16H 2001/2872; F16H 2001/289; F16H 2001/2881; F16H 1/46; B64C 25/36; B64C 25/405

See application file for complete search history.

(56) References Cited

U.S. PATENT DOCUMENTS

| 3,258,995 A | * | 7/1966 | Bennett | F16H 57/02004 |
| | | | | 475/342 |
| 4,114,479 A | | 9/1978 | Ashfield | |
| 4,296,650 A | * | 10/1981 | Kalns | F16H 3/663 |
| | | | | 188/170 |

(Continued)

FOREIGN PATENT DOCUMENTS

| DE | 4216398 | 11/1993 |
| DE | 102011108473 A1 | 1/2013 |

OTHER PUBLICATIONS

SAE Technical Paper Series 810102; Howard L. Benford & Maurice B. Leising, The Lever Analogy: A New Tool in Transmission Analysis, 1981, Detroit, MI: See at least p. 8 (6).

(Continued)

*Primary Examiner* — David J Hlavka

(57) ABSTRACT

An epicyclic gearbox with an integral arrangement of meshing gear elements, including an annulus gear, planet gears, and sun gears, to transfer power from a motive power source to a driven element with a range of applications is provided. The annulus gear, in contact with the power source, forms an exterior gearbox input and is in meshing contact with a number of stepped planet gears supported on floating planet carriers. Each stepped planet gear is positioned internally of the annulus gear and includes two planet stages in meshing contact with corresponding sun gear stages. One of the sun gear stages is an interior gearbox output and transfers power to a machine or device to be driven. Meshing surfaces of the gear elements support helical teeth or spur teeth, with numbers of teeth on meshing gear elements selected for optimal torque transfer from the exterior input to the interior output.

20 Claims, 4 Drawing Sheets

(56) References Cited

U.S. PATENT DOCUMENTS

| | | | |
|---|---|---|---|
| 4,528,470 A | | 7/1985 | Young et al. |
| 5,295,922 A | * | 3/1994 | Amborn ............... B60K 17/346 |
| | | | 475/248 |
| 5,364,319 A | | 11/1994 | Boll et al. |
| 6,402,654 B1 | * | 6/2002 | Lanzon ................ B60K 17/344 |
| | | | 475/204 |
| 7,232,400 B2 | * | 6/2007 | Hill .......................... F16H 3/66 |
| | | | 475/299 |
| 8,057,352 B2 | * | 11/2011 | Nishiji .................. F16H 48/285 |
| | | | 475/180 |
| 8,720,306 B2 | * | 5/2014 | McCune ................. F01D 15/12 |
| | | | 74/665 GD |
| 9,702,438 B2 | * | 7/2017 | Boulet ...................... F16H 3/66 |
| 10,234,011 B2 | * | 3/2019 | Meffert .................. F16H 55/17 |
| 2005/0264112 A1 | * | 12/2005 | Tanaka .................... B60B 27/02 |
| | | | 310/750 |
| 2009/0062058 A1 | * | 3/2009 | Kimes ...................... F16H 1/28 |
| | | | 475/344 |
| 2012/0309578 A1 | * | 12/2012 | Solka ................... F16H 37/041 |
| | | | 475/149 |
| 2016/0238108 A1 | | 8/2016 | Kanai et al. |
| 2017/0334516 A1 | | 11/2017 | Ferguson |
| 2018/0283503 A1 | * | 10/2018 | Georgiev .................. F16H 3/56 |

OTHER PUBLICATIONS

American Gear Manufacturers Association (ANSI/AGMA 6123-C16): Design Manual for Enclosed Epicyclic Gear Drives. See at least p. 16, Figure 3; pp. 18-19, Gear F; p. 22, Figure 8; pp. 27-28; pp. 36-37; p. 45.

Combined Search and Examination Report, Application No. GB1903927.0 (dated Sep. 6, 2019).

* cited by examiner

EPICYCLIC GEARBOX

PRIORITY CLAIM

This application claims priority from U.S. Provisional Patent Application No. 62/647,172, filed 23 Mar. 2018, the entire disclosure of which is fully incorporated herein.

TECHNICAL FIELD

The present invention is directed generally to epicyclic reduction and is directed particularly to a novel gearing arrangement and configuration in an epicyclic gearbox.

BACKGROUND OF THE INVENTION

Epicyclic gearing, which has a history of use extending to at least the first century BC, has evolved over time to include simple and complex arrangements of gear elements. The name is derived from the epicycloid curve traced by a point on a planet gear mounted on a rotating carrier as the planet gear moves around a sun gear. This type of gearing arrangement may include four different elements: a sun gear, three or more planet gears, a carrier that rotatably supports the planet gears, and an annulus or ring gear. Various fixed and rotating arrangements of these elements are found in different types of epicyclic gears. Unique gear ratios are typically employed to connect the elements. Depending on the arrangement, different ones of the elements, such as the sun gear, the carrier, and/or the annulus or ring gear, may function as an input or an output as power is transferred through an epicyclic gearbox. The number of teeth in each gear element and which elements are stationary determine a ratio of input rotation to output rotation.

The design complexity of epicyclic gearing arrangements may have elements that are not as accessible and that require increased bearing loads and lubrication demands compared to other gearing arrangements. However, epicyclic gearing arrangements may also be capable of minimizing mechanical power losses inside a gearbox so that a high proportion of input energy is transmitted to the output. When an epicyclic gearing arrangement has multiple planet elements, the shared load distribution possible may produce beneficial torque density, although increasing the number of planet elements may not always be advantageous.

Epicyclic reduction gearboxes are typically designed with the input elements positioned interiorly of output elements, which presents challenges to providing input force and power to interiorly located input elements when the source of motive or driving force to power the epicyclic gearbox is located exteriorly of the gearbox. Additional structural elements are required to direct the driving force from the exterior source of motive power to the interiorly positioned input elements so that power may then be transferred to an output located exteriorly of the input. Some epicyclic gearboxes that produce a high torque output may require such additional structure to ensure rotational stability and speed control. This additional structure may include an interiorly located small diameter pinion shaft attached to a sun gear input element in a gear set having a planetary configuration to direct power from the input in the interior of the gearbox to an exterior output. The gearbox mass and dimensions required to produce this high torque output limits the applications where such epicyclic gearboxes may be used.

Consequently, there is a need for a compact, reduced mass epicyclic gearbox designed to meet output torque requirements in a wide range of applications without these additional structural elements and that transfers motive power from an exteriorly located power source through the gearbox elements to an interiorly positioned output element to provide driving power to a device to be driven by the gearbox.

SUMMARY OF THE INVENTION

It is primary object of the present invention to provide a compact, reduced mass epicyclic gearbox capable of meeting torque requirements for a range of applications that transfers power from a source of motive power located exteriorly of the gearbox through the gearbox to a torque output gear element located interiorly within the gearbox without additional motive power-transferring structural elements.

It is another object of the present invention to provide an axially compact, reduced mass epicyclic gearbox with an external input gear element in a multiple stage arrangement of gearing elements positioned to receive and transfer driving force from a source of motive power located exteriorly of the gearbox to an interiorly located internal output gear element.

It is an additional object of the present invention to provide a rotationally stable gearbox configured to produce a high torque output within a compact integral arrangement of meshing gear structures with inter-stage gear ratios selected to optimize mesh frequency.

It is an additional object of the present invention to provide an axially compact, reduced mass epicyclic gearbox with an arrangement of gearing elements configured and arranged to optimize load sharing capacity.

It is a further object of the present invention to provide a compact, reduced mass epicyclic gearbox with an arrangement of gear elements having tooth counts on meshing gear elements selected to suppress adverse mesh frequency harmonics during operation.

It is a further object of the present invention to provide a compact reduced mass epicyclic gearbox with a multiple stage arrangement of helical or spur gear elements that improves power transfer density during operation as power is transferred through the gearbox from an external source of driving power to an exteriorly positioned input gear element through the gearbox to an interiorly positioned output gear element to direct torque to a machine or device to be driven located internally of the gearbox from the source of driving power.

It is yet a further object of the present invention to provide an axially compact, reduced mass epicyclic gearbox designed for applications requiring the transfer of power and torque from a drive motor to a drive wheel mounted on an axle that employs the axle as the center of rotation for the wheel and the gearbox drive motion.

It is yet a further object of the present invention to provide a method for transferring driving force through an axially compact epicyclic gearbox from an externally located source of motive power through a high ratio torque-increasing integral arrangement of gearing elements to an internally located gearbox output gear element that transfers the driving force required to drive a device or machine connected to the gearbox.

In accordance with the foregoing objects, an axially compact, reduced mass epicyclic gearbox is provided that has an integral arrangement of gearing elements located to transfer power from a source of motive power located exteriorly of the gearbox directly to an input gearing element in power transfer contact with the source of motive power to an output gearing element positioned internally within the gearbox. The arrangement of gearing elements may include an external annular gear element that functions as an input in meshing contact with a number of stepped planet gear elements supported on a floating planet carrier. Planet gear stages on each stepped planet gear element are positioned internally of and in meshing connection with the annular gear element and in meshing contact with corresponding sun gear stages. Multiple sets of stepped planet gear elements may be provided in the gearbox and supported by the floating carrier. The external annular gear element, which is the gearbox input, is in power transfer contact with the source of motive power and directs power to an interiorly positioned sun gear stage that functions as the gearbox output. The gearbox is configured to transfer power from the interior sun gear stage to a device or machine to be driven. The integral arrangement of gearing elements produces a high ratio torque-increasing gearbox that employs only the gear elements to uniquely transfer driving power from the exterior of the gearbox to the interior of the gearbox without requiring any additional structure. Meshing surfaces of each of the gear elements may support teeth that have a helical configuration or teeth that have a spur configuration. Numbers of teeth on the meshing geared elements may be selected to suppress or minimize adverse mesh frequency harmonics and optimize operation of the gearbox. The compact, reduced mass gearbox of the present invention may be effectively employed in a wide range of power and torque transfer applications.

Other objects and advantages will be apparent from the following description, drawings, and claims.

DESCRIPTION OF THE INVENTION

There are many applications that require gear systems and gearboxes that are capable of effectively transferring driving power and torque from an input source of motive force through an output to drive another machine or device within a relatively small space or volume. Ideally, power should be transferred through a gearbox with minimal power loss during transfer so that power density is optimized. It may also be desirable in many applications to minimize the dimensions and mass of the gear elements within the gearbox and the dimensions of the gearbox itself without adversely affecting power and torque transfer, which may permit high gear ratios required for such applications. Load distribution may have an effect on the extent to which gearbox and gear element dimensions and mass may be minimized in a particular application. The epicyclic gearbox of the present invention addresses these considerations and is useful for producing torque requirements in a wide range of applications. The present epicyclic gearbox is a rotationally stable structure that minimizes space demands and mass with an integral arrangement of gear elements that transfers power and torque through the gearbox from the exterior to the interior of the gearbox to optimize load distribution and power density.

Figure 1:
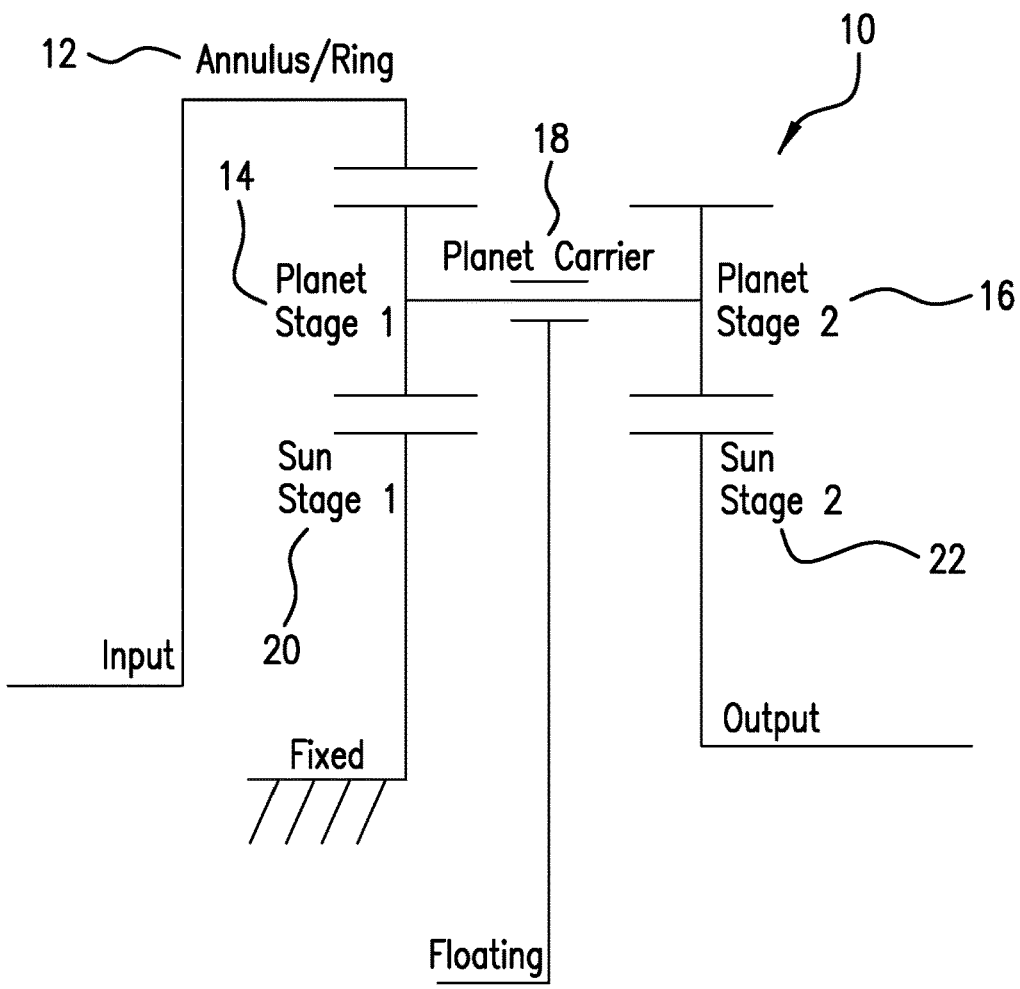
FIG. 1 is a diagram of the arrangement of gear elements in an epicyclic gearbox according to the present invention showing the relative positions of the input and output elements.

FIG. 1 is a diagram of a gear arrangement for an epicyclic gearbox 10 according to the present invention and shows a relative arrangement of gear stages in the gearbox. An annulus or ring gear 12 functions as the input and will be connected to a source of motive power or drive force (not shown). The first planet stage 14 and the second planet stage 16 are supported in a stepped arrangement on a floating planet carrier assembly 18 that will be described below. The annulus or ring gear 12 is in meshing contact with the first planet stage 14 and is not in meshing contact with the second planet stage 16. The first planet stage 14 meshes with a first sun stage 20, and the second planet stage 16 meshes with a second sun stage 22. The first sun stage 20 is fixed, and the second sun stage 22 functions as the output.

Figure 2:
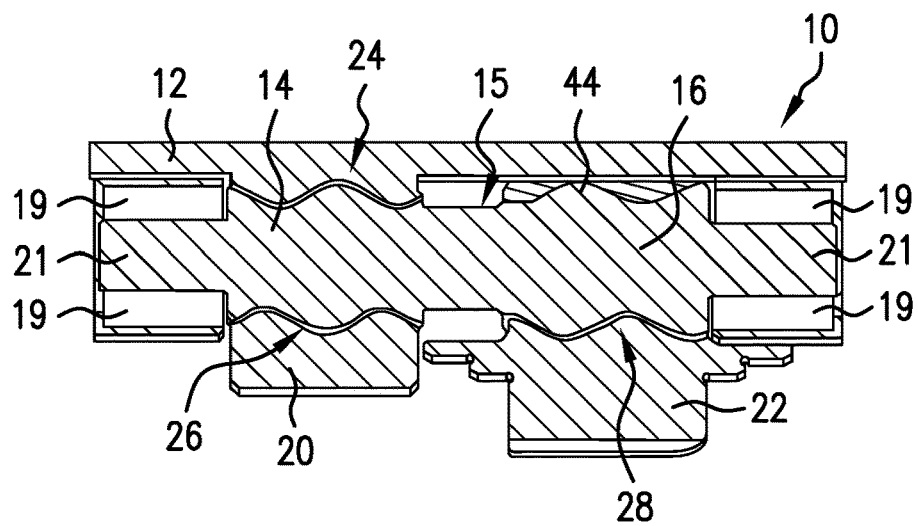
FIG. 2 is a cross-sectional view of the gear elements shown in FIG. 1 in an epicyclic gearbox according to the present invention.

FIG. 2 of the drawings illustrates, in cross-section, an integral arrangement of the functional gear elements in the gearbox 10 shown diagrammatically in FIG. 1. The epicyclic gearbox of the present invention may use a stepped epicyclic gearing arrangement with helical or spur gear elements. An external configuration of the epicyclic gearbox of the present invention and the exterior and interior orientations of the gear elements and other components will be more clearly seen in FIGS. 3 and 4. The annulus or ring gear 12 is positioned to engage a stepped planet gear arrangement, which includes the first stage planet gear 14 positioned coaxially with the second stage planet gear 16 on a shaft 15. The first stage planet gear 14 and the second stage planet gear 16 may rotate at the same rotational speed. Therefore, the shaft 15 and the first and second stage planet gears 14 and 16 may have a unitary construction and may be manufactured from a single piece of a suitable material. The stepped planet gear may be rotatably supported by a floating planet carrier 18 (shown in FIGS. 3 and 4) that floats within the epicyclic gearbox 10. The floating planet carrier 18 provides a compliant mounting for the stepped planet gears through bearings 19 mounted on bearing races 21. This arrangement may also improve load sharing within the epicyclic gearbox. The design of the floating planet carrier assembly 18 may promote axial alignment and may enable the planet carrier assembly to minimize and absorb deflection. The first stage planet gear 14 is located to be in meshing engagement with the annulus or ring gear 12 at area 24. The second stage planet gear 16 does not mesh with the annulus 12.

A first stage sun gear 20 is positioned to mesh with the first stage planet gear 14 at area 26, and a second stage sun gear 22 is positioned to mesh with the second stage planet gear 16 at area 28. The first stage sun gear 20 may be fixed and will not rotate. The second stage sun gear 22, which, as noted, is the output for the gearbox 10, may be configured to connect with a toothed element 30, discussed below. The annulus, planet, and sun gear stages mesh with adjacent gears at the respective areas 24, 26, and 28 through a number of gear teeth as discussed below in connection with FIG. 5. The teeth may have a helical configuration or a spur configuration.

The annulus or ring gear 12 functions as the input for the epicyclic gearbox 10 and will be in power transfer contact with a source of motive power (not shown) to receive driving power to be transferred through the gearbox. The second stage sun gear 22 is not fixed, and power initially received from the source of motive power by the annulus or ring gear 12 and transferred to the first stage planet gear 14 is ultimately transferred from the second stage sun gear 22 output to drive a device or machine to be powered by the epicyclic gearbox.

Figure 3:
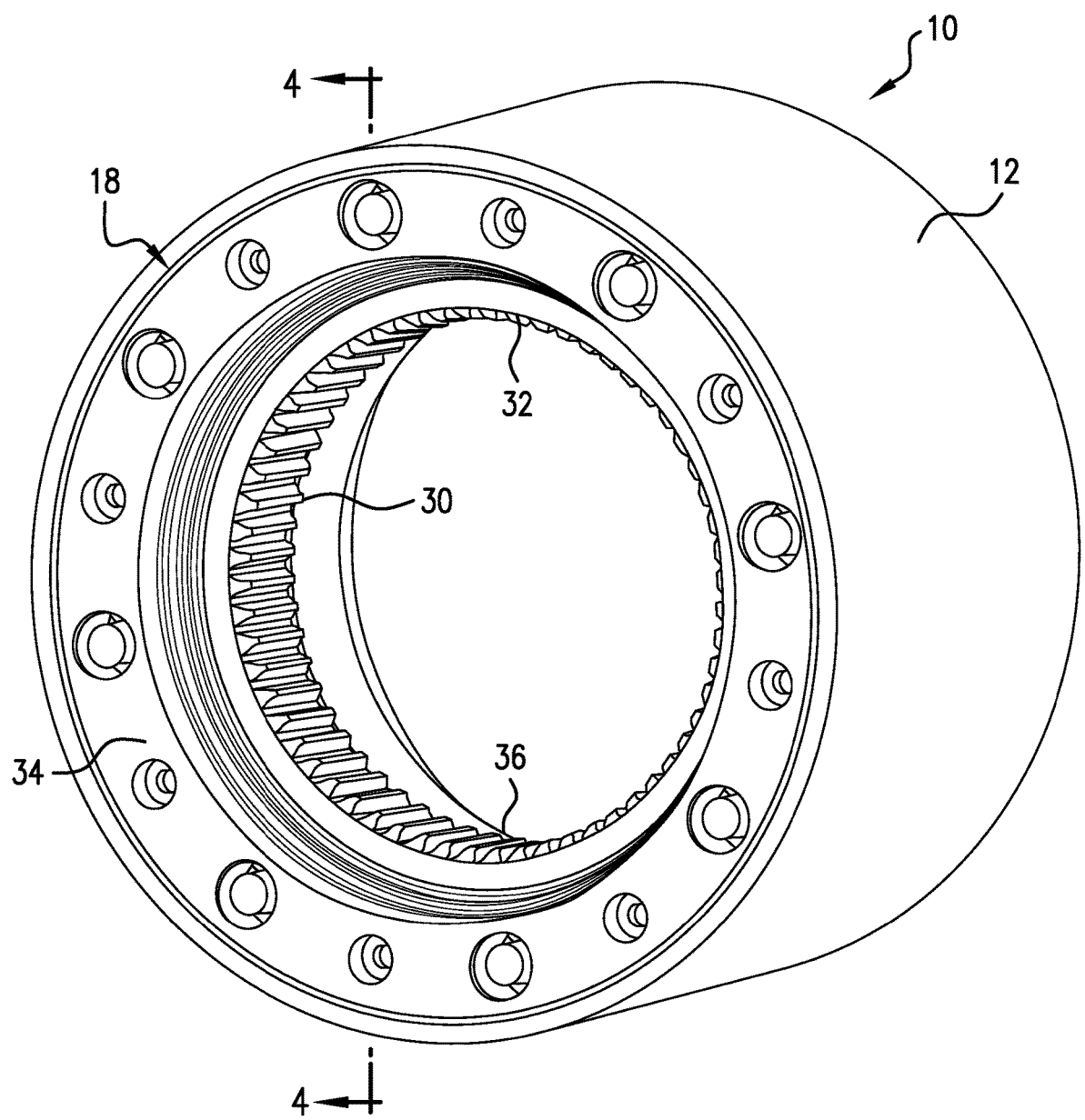
FIG. 3 is a perspective view of exterior surfaces and structures in an embodiment of the epicyclic gearbox according to the present invention.

FIG. 3 illustrates a perspective view of exterior surfaces and structures in an embodiment of the epicyclic gearbox according to the present invention with the arrangement of gearing elements shown and described in connection with FIGS. 1 and 2, which, with the exception of the annulus or ring gear 12, are not visible. The annulus 12 is a circumferential element located exteriorly of the planet and sun gear stages (not shown in FIG. 3) in the gearbox 10 and may form the exterior circumferential surface of the gearbox 10 in some applications. The annulus 12, as noted, is the input drive element for the gearbox 10 and may have a diameter and a mass that provide rotational stability during operation.

The gearbox 10 may include a number of the stepped planets shown in the drawings and discussed herein. The specific number of stepped planets will depend on the use or application of the gearbox. The position of the floating planet carrier assembly 18 relative to the annulus or ring gear 12 may be seen in FIG. 3. The floating planet carrier assembly 18 may be constructed with spaced outer and inner circumferential sections or end rings that may be connected by transverse elements (shown in FIG. 4) that hold the end rings of the floating planet carrier assembly in place. The bearing races 20 and bearings 19 of the number of stepped planet gears used in an application are supported by the floating planet carrier assembly 18 as discussed below in connection with FIG. 4. A toothed element 30 may engage a device or machine (not shown) to be driven by connection to the second sun gear stage 22 output of each of the number of stepped planet gears.

Figure 4:
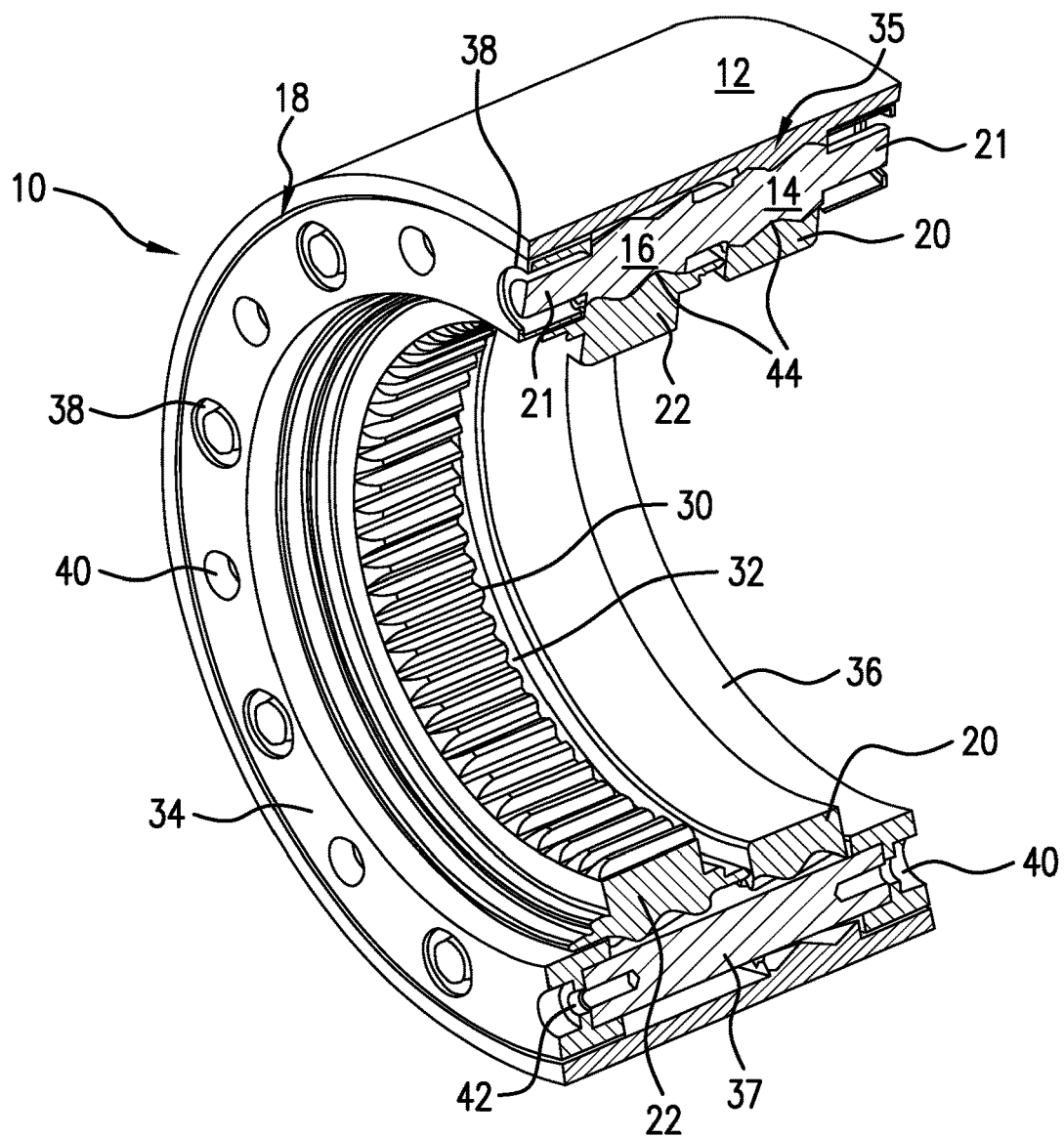
FIG. 4 is a cross-sectional view taken along line 4-4 of FIG. 3 and illustrates a portion of the FIG. 3 embodiment of the epicyclic gearbox according to the present invention.

FIG. 4 illustrates a cross-sectional view taken along line 4-4 of FIG. 3 and illustrates a portion of the FIG. 3 embodiment of the epicyclic gearbox 10 according to the present invention. The relationships of the integral arrangement of gear elements shown diagrammatically in FIG. 1 and described and shown in connection with FIG. 2 can be seen more clearly. The epicyclic gearbox 10 in this view shows one planet gear set 35 with stepped first and second planet stages 14 and 16 and corresponding meshing first and second sun gear stages 20 and 22. The orientation of the planet gear set 35 within the gearbox 10 with respect to the annulus 12, the floating planet carrier assembly 18, and the toothed element 30 are shown in FIG. 4. The toothed element 30 may extend circumferentially on an interior surface 32 of the gearbox 10. The toothed element 30 may be formed integrally with the second sun gear stage 22 so that the output extends circumferentially internally of the annulus or ring 12 on the gearbox interior surface 32. The toothed element 30 may also be a structure separate from the second sun gear stage 22 and may be configured to have a power transfer connection with the second sun gear stage.

The support of the stepped planet gears by the floating planet carrier assembly 18 is shown in FIG. 4. Although only one planet gear set 35 is shown, additional planet gear sets required by a gearbox application may also be similarly supported. An exterior end ring portion 34 of the floating planet carrier assembly 18 may form an exterior face of the gearbox 10 as shown, and an opposed interior end ring portion 36 may form an interior face of the gearbox 10. In this embodiment, spaced apertures 38 may be provided in the exterior and interior end ring portions of the planet carrier assembly 18 and may be sized to receive the bearing races 21 and bearings 19 (shown in FIG. 2) of the planet gear set 35 and additional planet gear sets.

FIG. 4 shows a set 35 of stepped planet gears supported in apertures 38 in the exterior end ring portion 34 and the interior end ring portion 36 of the floating planet carrier assembly 18. In the planet gear set 35, the bearing races 21 are shown positioned in apertures 38. The bearings 19 are not shown. A number of transverse elements 37 may be provided to hold the exterior end ring portion 34 and the interior end ring portion 36 of the floating planet carrier assembly 18 together. A single transverse element 37 is shown positioned about 180° around the circumference of the floating planet carrier assembly 18 from the planet gear set 35. The transverse element 37 may extend between the exterior end ring portion 34 and the interior end ring portion 34. A differently configured set of apertures 40 may be provided in the floating planet carrier assembly end ring portions 34 and 36 to receive fasteners 42 that secure the transverse element 37 in place. Only one fastener 42 is shown securing the transverse element 37 to the exterior end ring portion 34. The numbers and positions of the circumferentially spaced transverse elements 37 provided to hold the floating planet carrier assembly in place in the gearbox 10 may vary, depending, among other factors, on the size and application of the gearbox.

The floating planet carrier assembly 18 may support multiple sets of stepped planet gears that are spaced at intervals about the circumference of the floating planet carrier assembly 18, as required by the gearbox 10. In some gearbox applications, the sets of planet gear stages 14, 16 and meshing sun gear stages 20, 22 may be equally spaced about the circumference of the floating planet carrier assembly 18. The specific number of stepped planet gear sets 35 will depend on the specific application in which the epicyclic gearbox 10 will be used. When an epicyclic gear design includes multiple stepped planet gears, there are multiple paths for the transmission of power, and an increased capacity for load sharing. Torque density may also be increased.

Figure 5:
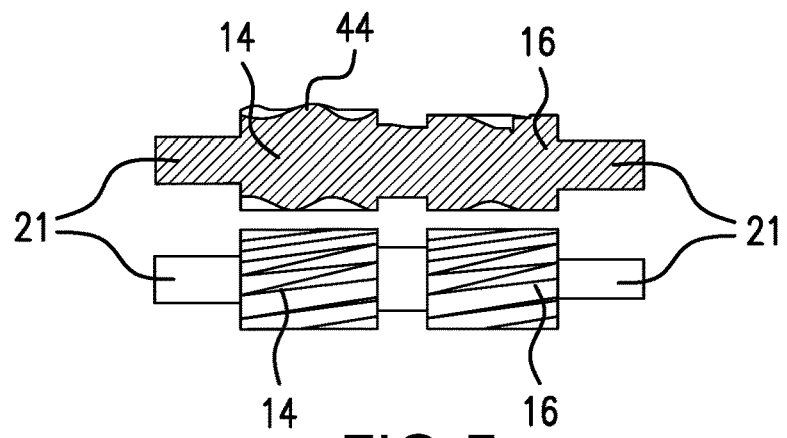
FIG. 5 illustrates front and cross-sectional views of a stepped planet gear useful in an epicyclic gearbox according to the present invention.

FIG. 5 illustrates front and cross-sectional views of one embodiment of a stepped planet gear useful in an epicyclic gearbox 10 according to the present invention. In this embodiment of the epicyclic gearbox 10, the gear teeth 44, only one of which is labeled, have a helical configuration. The helical gear teeth 44 on the first and second planet gear stages 14 and 16 mesh with helical gear teeth on the corresponding sun gear stages 20 and 20. While helical gear teeth are shown and referred to in this embodiment, spur gear teeth may also be used. The present invention contemplates that gear teeth having a helical configuration or a spur configuration may be provided for meshing surfaces of the annulus 12, the first and second planet gear stages 14 and 16, and the first and second sun gear stages 20 and 22. Both spur gear teeth and helical gear teeth may transfer loads effectively at the meshing surfaces in areas 24, 26, and 28 in the present epicyclic gearbox 10. Loads transferred through the present gearbox design may be effectively shared between the meshing surfaces among multiple teeth, which may improve strength and life as a function of the distributed load. Helical gear teeth may be preferred over spur gear teeth in some applications. Helical gear teeth present a higher effective face, which may produce some improvements in load transfer and power density. In addition, gear face width may be reduced further when helical teeth are used, which may reduce axial space in the gearbox.

The relative numbers of helical or spur teeth 44 on the annulus or ring gear, the planet gear stages, and the sun gear stages affects the meshing and operation of the gears during operation of the gearbox 10. The number of planet gear sets 35 used in the gearbox 10 and the number of teeth in mesh will define the mesh frequency and in phase characteristics. Each stage may be evaluated to determine mesh frequency and in phase characteristics. The numbers of teeth in mesh at areas 24 and 26 (FIG. 2) between the first stage planet 14 and, respectively, the annulus 12 and the first stage sun gear 20 may be analyzed and evaluated separately from the number of teeth in mesh between the second sage planet 16 and the second stage sun gear 22 at area 28.

The numbers of teeth on each of the gears may affect the transfer of dynamic loads during gearbox operation. Optimal mesh phasing, which considers net forces and moments from all of the sun-planet and annulus or ring-planet gear tooth meshes, may reduce noise and improve durability of the structures in the epicyclic gearbox 10. When mesh phasing was analyzed for different numbers of meshing gear teeth on the meshing gears in the epicyclic gearbox of the present invention, it was determined that numbers of gear teeth may be selected for each of the meshing gears that will suppress adverse mesh frequency harmonics during operation. Selection of an optimal number of gear teeth for meshing gears in the present epicyclic gearbox produces mesh resonance that may enable cancellation of adverse harmonic forces and torques during gearbox operation and optimize operation of the gearbox 10. Further, the use of non-common tooth ratio selections may reduce the impacts of normal spinning vibration modes and drive harmonics usually associated with epicyclic gearboxes at recommended rotational speeds.

The tooth counts of the meshing gear elements in the epicyclic gearbox 10 of the present invention may be varied to affect the gear reduction that may be achieved as power is transferred from the annulus or ring gear 12 input through the planet gear stages 14, 16 to the sun gear stages 20, 22 and to the sun gear stage 22 output. The variation in tooth count will depend on the extent of gear reduction to be achieved.

It is contemplated that operation of the epicyclic gearbox of the present invention may be controlled by software appropriate for the application in which the gearbox will be used to transfer power or torque from the input annulus or ring gear 12 through the planet and sun gear stages to the sun gear stage output 22.

Figure 6:
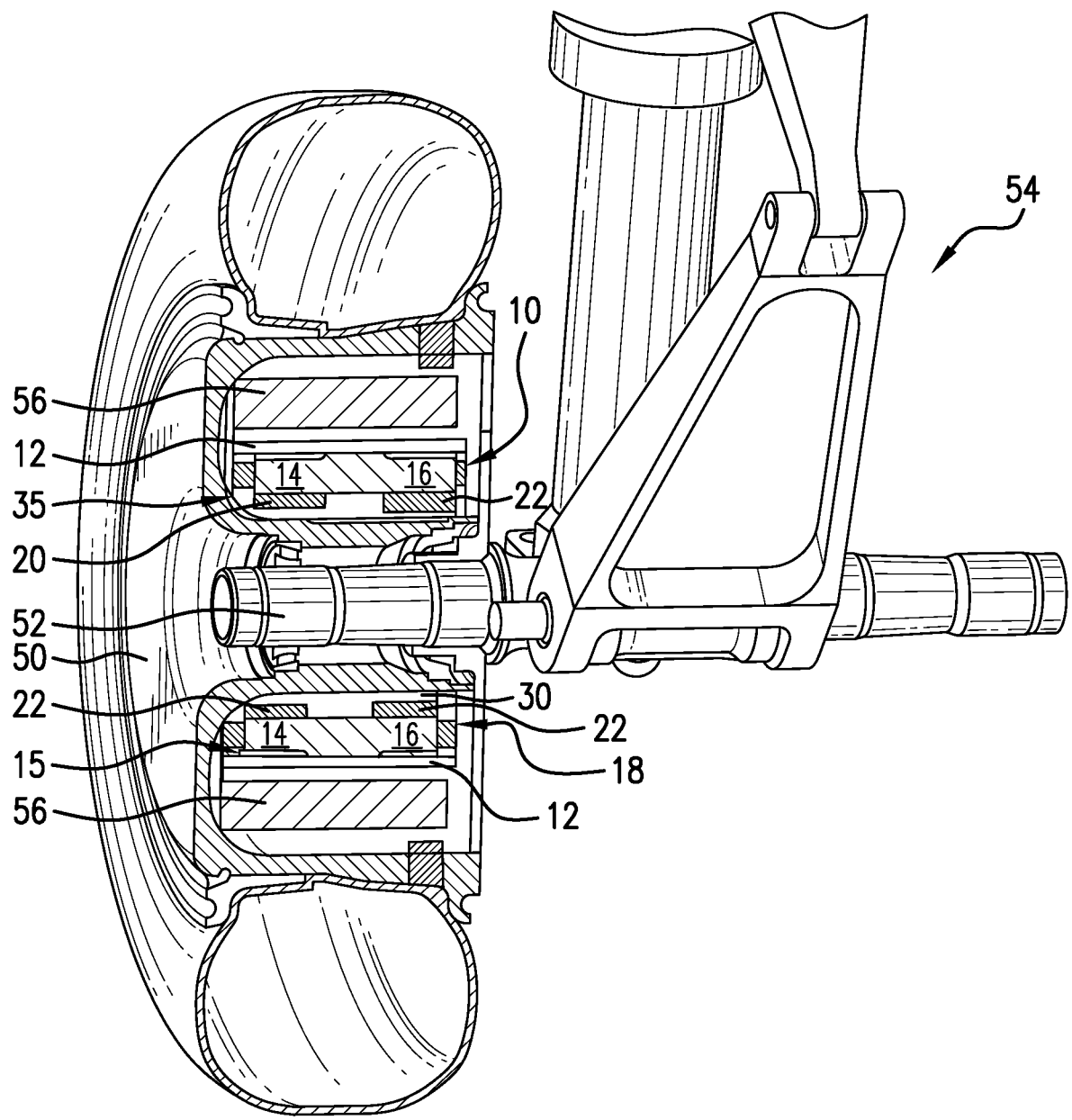
FIG. 6 illustrates schematically an exemplary application of the epicyclic gearbox of the present invention in an aircraft landing gear wheel drive system.

FIG. 6 illustrates an example of an application of the epicyclic gearbox 10 of the present invention. In this example, the epicyclic gearbox 10 is used to transfer driving torque from a drive motor to an aircraft landing gear wheel. The same reference numbers used in connection with FIGS. 1-5 to describe the gearbox and the integral arrangement of gearing elements are used in FIG. 6. In this application, the gearbox 10 is installed within a wheel 50 mounted on an axle 52 of an aircraft landing gear 54. The wheel 50 is powered by a drive motor 56, which may be an electric drive motor. The drive motor is mounted completely within the dimensions of the wheel 50 to power the landing gear wheel and move an aircraft autonomously or independently during ground travel without reliance on operation of the aircraft's engines or assistance from external tow vehicles. The drive motor 56 may be engaged by a clutch assembly (not shown). The gearbox 10 is also mounted completely within the wheel 50 to receive motive power from the drive motor 56 and transfer driving torque to the wheel 50.

The annulus or ring gear 12 is located to receive motive power from the drive motor 56; the mechanism that transfers power from the drive motor to the gearbox annulus input is not shown. Two stepped planet gears 35 that may be connected to a floating planet carrier assembly 18 as described are shown. The first and second planet gear stages 14 and 16, and the corresponding meshing sun gear stages 20 and 22 are identified relative to the annulus 12 and within the gearbox positioned in the wheel 50. The areas 24, 26, and 28 where these gears mesh are not labeled; they may be in the same relative locations as shown and described in connection with FIG. 2. Toothed element 30 is indicated adjacent to the second sun gear stage 22 and may be connected to a clutch (not shown). The axle 52, which is static, may serve as the center of rotation for the wheel 50 and the gearbox 10 drive motion. The arrangement of the power transfer gear elements in the epicyclic gearbox 10 in this drive wheel application achieves rotational stability and provides high density power transfer within the dimensions of an aircraft landing gear drive wheel.

In addition to the exemplary illustration of its use in a self-propelled aircraft landing gear wheel, the epicyclic gearbox 10 of the present invention may be employed in other vehicles wheels and in a wide range of additional applications where the transfer of power and torque must be accomplished within a limited space. The epicyclic gearbox of the present invention may also be employed in a wide range of other potential applications requiring the transfer of power and torque from a drive element to a driven element using a gear reduction ratio that increases torque during power transfer through the gearbox. Adaptations of the epicyclic gearbox described herein to work with these potential applications are contemplated to be within the scope of the present invention.

INDUSTRIAL APPLICABILITY

The epicyclic gearbox of the present invention is contemplated to have wide applicability and will be useful where it is desired to transfer power and torque from a source of motive power to a device or machine to be driven through a smaller, more efficient uniquely structured gearbox than has previously been available.

The invention claimed is:
1. An epicyclic reduction gearbox in power transfer contact between a source of motive force and a machine or device to be driven by the motive force, comprising:
    a) an annular gear element in power transfer contact with a source of motive power;
    b) a plurality of rotatably mounted stepped planet gear elements comprising toothed planet gear stages with different numbers of teeth on interior and exterior surfaces, wherein an interior surface of one of said planet gear stages is in meshing connection with said annular gear element; and
    c) toothed sun gear stages comprising a rotating sun gear stage and a fixed sun gear stage in meshing connection with exterior surfaces on said planet gear stages, wherein said annular gear element comprises an input element and said rotatable sun gear stage comprises an output element in power transfer contact with a machine or device to be driven.
2. The gearbox of claim 1, wherein said fixed sun gear stage is in meshing connection with said one planet gear stage in meshing connection with said annular gear element.

3. The gearbox of claim 1, further comprising a floating planet carrier assembly supporting said stepped planet gear elements.

4. The gearbox of claim 3, wherein said gearbox has a toroidal configuration with said annular gear element comprising an outer circumferential surface, said floating planet carriers comprising opposed faces at opposite extents of said outer circumferential surface, and an inner circumferential surface supporting a toothed element positioned between said rotatable sun gear stage and said device to be driven.

5. The gearbox of claim 4, further comprising a number of stepped planet gear elements supported at spaced intervals on said floating planetary carrier assembly in meshing connection with said annular gear element and in meshing connection with corresponding sun gear stages.

6. The gearbox of claim 1, wherein teeth on said annular gear element, said planet gear stages, and said sun gear stages comprise helical gear teeth or spur gear teeth.

7. The gearbox of claim 6, wherein numbers of teeth on said annular gear element, said planet gear stages, and said sun gear stages are selected to minimize adverse mesh frequency harmonics when said annular gear element, said planet gear stages, and said sun gear stages are in meshing connection.

8. The gearbox of claim 4, wherein said source of motive force comprises a drive motor, said machine or device to be driven comprises an aircraft landing gear wheel rotatably mounted on an axle, and wherein said annular gear element is in power transfer contact with said drive motor and one of said sun gear stages is in output power transfer contact with said toothed element.

9. The gearbox of claim 8, wherein said gearbox is mounted within dimensions of said aircraft landing gear drive wheel.

10. The gearbox of claim 1, further comprising a planet carrier having a pair of spaced circular floating planetary carrier assembly end rings with apertures spaced at intervals about circumferences of said floating planetary carriers to receive connector elements for said end rings and to support bearings and bearing races on each of said plurality of stepped planet gear elements.

11. An epicyclic reduction gearbox in power transfer contact between a source of motive force and a machine or device to be driven by the motive force, comprising
   a) an annular gear element in power transfer contact with a source of motive power, said annular gear element having an interior circumferential surface supporting annular gear teeth;
   b) a plurality of stepped planet gear elements rotatably supported on planet carrier assemblies mounted between said interior circumferential surface and an external circumferential surface of said annular gear element, each one of said plurality of stepped planet gear elements comprising planet stages supporting on an exterior surface of each said planet stage a first number of planet gear teeth in meshing connection with said annular gear teeth and on an interior surface of each said planet stage a second number of planet gear teeth;
   c) sun gear stages supporting sun gear teeth in meshing connection with said second number of planet gear teeth on each of said planet stages, wherein one of said sun gear stages is fixed to a gearbox and another of sun gear stages rotates; and
   d) an input element and an output element, wherein said input element comprises said annular gear element, and said output element comprises said rotating sun gear stage in power transfer contact with a device to be driven.

12. The gearbox of claim 11, wherein said annular gear element comprises an exterior gearbox input and said rotating sun gear stage comprises an interior gearbox output.

13. The gearbox of claim 12, wherein said plurality of stepped planet gear elements are rotatably supported on a pair of floating planet carrier assemblies spaced axially between said interior circumferential surface and said external circumferential surface at intervals about circumferences of said pair of floating planet carrier assemblies.

14. The gearbox of claim 13, further comprising attachment elements securing said spaced pair of floating planet carrier assemblies spaced circumferentially between said interior circumferential surface and said external circumferential surface of said annular gear element.

15. The gearbox of claim 11, wherein a number of said annular gear teeth, said first number of planet gear teeth, said second number of planet gear teeth, and a number of said sun gear teeth are selected to minimize adverse mesh frequency harmonics when said annular gear element, said planet gear stages, and said sun gear stages are in meshing connection.

16. The gearbox of claim 15, wherein said number of said annular gear teeth, said first number of planet gear teeth, said second number of planet gear teeth, and said number of said sun gear teeth comprise helical gear teeth or spur gear teeth.

17. The gearbox of claim 11, wherein numbers of meshing gear teeth for said annular gear element, said planet gear stages, and said sun gear stages are selected to produce mesh resonance and optimize transfer of dynamic loads during gearbox operation.

18. The gearbox of claim 11, wherein said source of motive force comprises an electric drive motor, said machine or device to be driven comprises an aircraft landing gear wheel rotatably mounted on an axle, and wherein said annular gear element is in power transfer contact with said drive motor and one of said sun gear stages is in output power transfer contact with said toothed element.

19. The gearbox of claim 17, wherein said gearbox is sized to be mounted within dimensions of said aircraft landing gear drive wheel.

20. The gearbox of claim 11, wherein said source of motive force comprises a drive motor, said machine or device to be driven comprises a vehicle wheel rotatably mounted on an axle, and wherein said annular gear element is in power transfer contact with said drive motor and one of said sun gear stages is in output power transfer contact with said toothed element.

\* \* \* \* \*